United States Patent

[11] 3,585,517

[72] Inventor Roger B. Herbert
Williamsville, N.Y.

[21] Appl. No. 725,852

[22] Filed May 1, 1968

[45] Patented June 15, 1971

[73] Assignee Westinghouse Electric Corporation
Pittsburgh, Pa.

[54] HIGH-EFFICIENCY POWER AMPLIFIER
4 Claims, 7 Drawing Figs.

[52] U.S. Cl. .......... 330/10, 332/9, 321/9, 330/117, 330/24

[51] Int. Cl. .......... H03f 3/3

[50] Field of Search .......... 330/10; 332/10, 9; 321/9 A

[56] References Cited

UNITED STATES PATENTS

| | | | |
|---|---|---|---|
| 3,213,384 | 10/1965 | Landgruf et al. | 330/10 |
| 3,348,151 | 10/1967 | Holmes | 332/10 X |
| 3,112,365 | 11/1963 | Kihara | 332/9 X |
| 3,260,912 | 7/1966 | Gregory | 332/9 X |
| 3,413,570 | 11/1968 | Bruehe et al. | 332/9 |

*Primary Examiner*—Nathan Kaufman
*Attorneys*—F. H. Henson, R. G. Brodahl and A. S. Oddi

ABSTRACT: Described is a high-efficiency Class B power amplifier which operates at essentially 100 percent efficiency for all output voltages, either direct current or alternating current. This is accomplished by utilizing in the amplifier switching transistors in combination with chokes, the arrangement being such that unwanted voltages appear across the chokes at any instant. The chokes, being energy storing devices, can deliver their stored energy to the load after the transistors are turned off.

WITNESSES:

INVENTOR
Roger B. Herbert
BY
ATTORNEY

HIGH-EFFICIENCY POWER AMPLIFIER

BACKGROUND OF THE INVENTION

The usual Class B amplifier comprises a pair of transistors having their bases connected to opposite ends of the center-tapped secondary winding of an input transformer. The emitters of the transistors are connected to the opposite ends of a center-tapped primary winding of an output transformer, the center taps on the two windings being connected to one terminal of a source of supply voltage, while the other terminal of the same source is connected to the collectors of the aforesaid transistors. Input signals are applied across the primary winding of the input transformer, while output signals are taken from the secondary winding of the output transformer.

Such amplifiers, while used extensively, are inherently inefficient and are not desirable to amplify direct current signals. The inability to amplify direct current signals is due to the input and output transformers which they utilize and these, of course, cannot transmit direct current signals.

The inefficiency of the conventional Class B amplifier is due to the fact that the unwanted voltage (i.e., the difference between power supply voltage and load voltage) appears across one of the two transistors at any instant. The transistors, being incapable of storing energy, dissipate power in the amount of load current times unwanted voltage.

SUMMARY OF THE INVENTION

As an overall object, the present invention provides a new and improved Class B amplifier design which is capable of amplifying both alternating current and direct current signals and which is substantially 100 percent efficient.

Another object of the invention is to provide a Class B amplifier wherein an input reference waveform is utilized to produce a pulse width-modulated waveform in which the width of the pulses is a function of the amplitude of the reference. These pulses are then used in transistor-switching circuitry to reconstruct the original reference waveform which is now of greater amplitude and, hence, amplified.

In accordance with the invention, a Class B amplifier is provided comprising pulse width modulating means responsive to an input signal for producing an essentially square wave signal in which the width of the pulses is proportional to the instantaneous amplitude of the input or reference signal. Connected between the terminals of a source of supply voltage is an electric load device, a switch device such as a transistor and an inductor. Means are provided for causing the pulses in the square wave signal to periodically close the switch device such that when the switch device is closed, a portion of the voltage from the supply will appear across the inductor. When the switch device opens upon termination of a pulse in the square wave, the energy stored in the inductor is discharged through the load device. Thus, what would otherwise be unwanted voltage is stored in the inductor and then discharged through the load device rather than being dissipated in circuit elements within the amplifier itself.

The above and other objects and features of the invention will become apparent from the following detailed description taken in connection with the accompanying drawings which form a part of this specification, and in which.

Figure 3A:
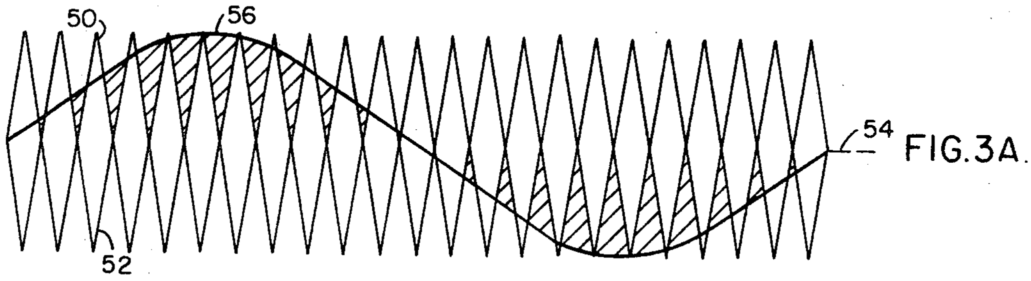
Figure 3B:
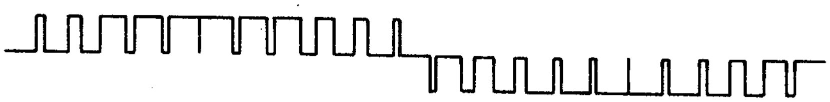
Figure 3C:
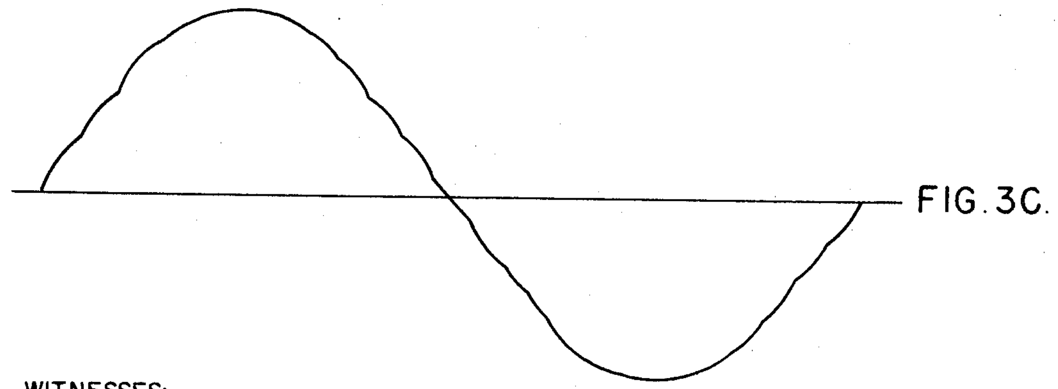
Figure 2:
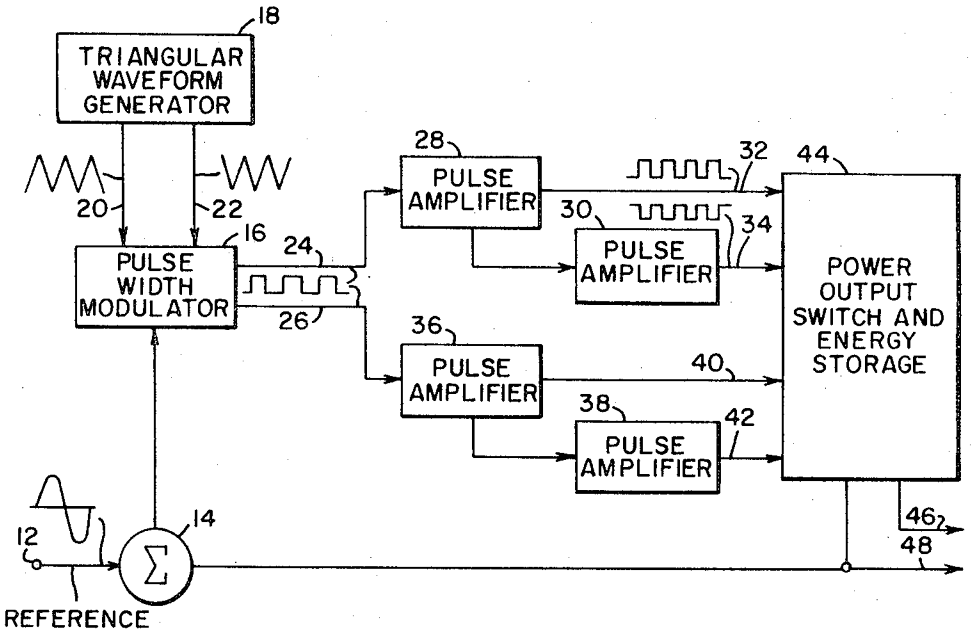
FIG. 2 is a block diagram of the Class B amplifier of the present invention.
Figure 4:
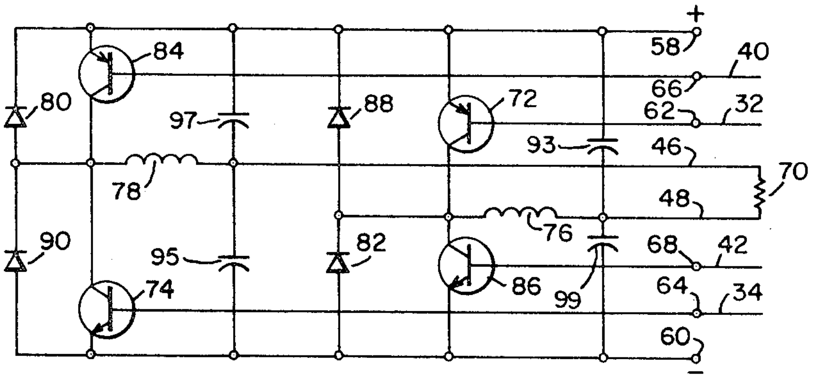
Figure 5:
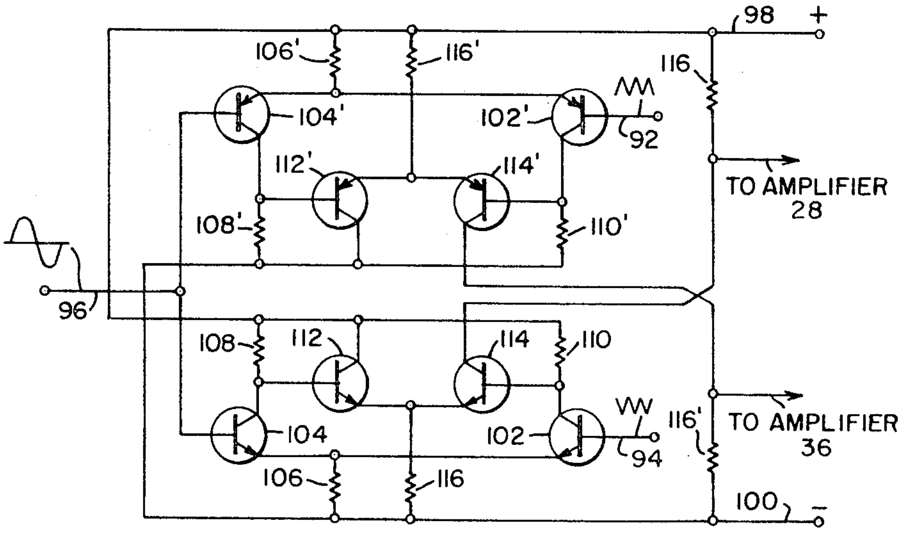

FIGS. 3A, 3B and 3C comprise waveforms illustrating the operation of the circuit of FIG. 2;

FIG. 4 is a detailed schematic diagram of the power output switch and energy storage device of the circuit of FIG. 2; and FIG. 5 is a schematic circuit diagram of one type of pulse width modulator which can be used in the system of FIG. 2.

Figure 1:
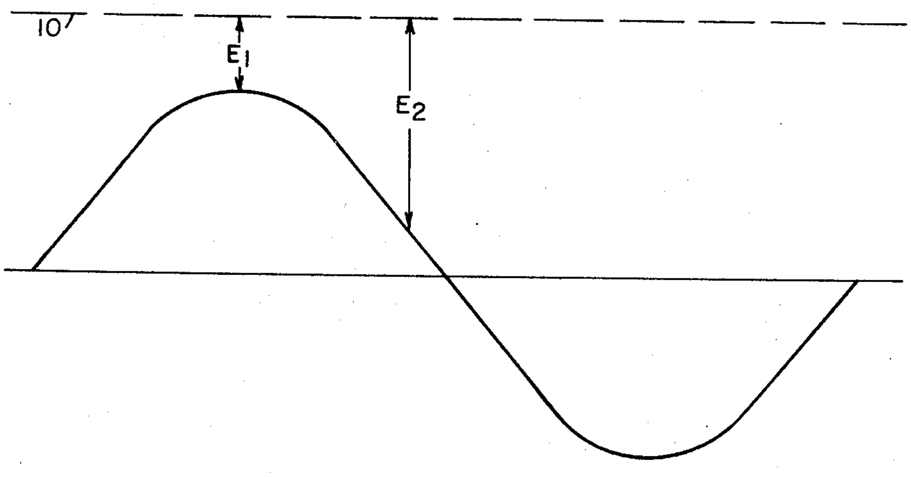
FIG. 1 is a waveform illustrating the manner in which power is dissipated in a conventional Class B amplifier.

With reference now to the drawings, and particularly to FIG. 1, a sinusoidal output from a conventional Class B amplifier is shown. The level of the supply voltage is indicated by line 10; and it will be seen that it is above the highest amplitude of the output sine wave. Of course, the only requirement is that the level of the supply voltage 10 be as large as the maximum expected amplitude of the sine wave, but in most cases the maximum amplitude will not be utilized. Consequently, there is an unwanted voltage $E_1$ even at the peak of the output sine wave; and this unwanted voltage is usually dissipated in the form of heat generated in the transistors of a conventional Class B amplifier. At lower amplitudes of the sine wave, even greater voltages, such as the voltage $E_2$, are dissipated in the amplifier.

The improved Class B amplifier of the present invention is shown in FIG. 2. The input signal, illustrated as a sine wave, is applied to input terminal 12 and thence through a summing point 14 to a pulse width modulator 16. Also applied to the pulse width modulator 16 from a triangular waveform generator 18 are two triangular waveforms on leads 20 and 22; which waveforms are 180° out of phase with respect to each other as will hereinafter be explained.

The pulse width modulator 16 produces a square wave output on either lead 24 or lead 26, depending upon the polarity of the applied reference signal. It will be assumed, for example, that pulses will be produced on lead 24 when the applied input signal is positive and on lead 26 when the applied input signal is negative. In either case, the square wave pulses at the output of the modulator 16 will have the same frequency as the triangular wave input, but the width of the pulses in the square wave will be dependent upon the amplitude of the applied reference signal. That is, as the amplitude increases, so do the widths of the output pulses from the modulator 16.

The pulses on lead 24 are applied to a pulse amplifier 28 and through amplifier 28 to a pulse amplifier 30, thereby producing on leads 32 and 34 square wave signals which are 180° out of phase with respect to each other. These signals on leads 32 and 34, however, will appear only when the reference signal is of such polarity as to produce a square wave on lead 24.

In a somewhat similar manner, pulses, when they appear on lead 26, are applied to pulse amplifier 36 and then through amplifier 36 to a second pulse amplifier 38, thereby producing on leads 40 and 42 square wave signals which are 180° out of phase with respect to each other. In accordance with the explanation given above, pulses will appear on leads 32, 34 or leads 40, 42; however, they will never appear on both sets of leads; and the set of leads on which pulses appear will be dependent upon the polarity of the input signal.

The pulses on leads 32, 34 or 40, 42 are applied to a power output switch and energy storage device 44, hereinafter described in detail, which converts the square wave input on leads 32, 34 or 40, 42 back into an amplified waveform corresponding to the reference waveform. Assuming, therefore, that the reference waveform is a sine wave, an amplified sine wave will appear across output terminal 46 and 48. This amplified waveform is also applied back to the summing point 14 in a feedback loop arrangement.

The operation of the invention can best be understood by reference to FIGS. 3A, 3B and 3C. In FIG. 3A, the waveform 50 represents, for example, the triangular waveform on lead 20 at the input to pulse width modulator 16; while the waveform 52 represents the triangular waveform on lead 22. Note that the waveforms 50 and 52 are 180° out of phase with respect to each other and that the positive peaks of waveform 52 are essentially at the same voltage level, identified by the line 54, as the negative peaks of the triangular waveform 50. The applied reference waveform is illustrated as a sine wave and identified by the reference numeral 56 in FIG. 3A.

The pulse width modulator 16 may take various forms well known to those skilled in the art and operates on the principle of coincidence of two input waveforms. That is, when a triangular waveform on lead 20 or 22 coincides with the reference waveform, an output pulse is produced. This is shown by the waveforms of FIG. 3A, taken in conjunction with the waveform of FIG. 3B which is the square wave output of the pulse width modulator. As the reference sine wave 56 increases in amplitude, its coincidence with the triangular waveform, shown by the shaded areas, increases. Consequently, the square wave pulses in the waveform of FIG. 3B gradually increase in width as the amplitude of the sine wave reference waveform 56 increases. After the reference waveform 56 reaches its peak in the positive direction and decreases in amplitude, the widths of the square wave pulses in the waveform of FIG. 3B also decrease.

On the negative half-cycle of the reference waveform 56, the triangular waveform 52 on lead 22 comes into play. Square wave pulses are again produced which gradually increase in width as the amplitude of the reference waveform increases in the negative direction, and decrease in width as the reference waveform again approaches the zero axis. While shown in FIG. 3B as being of opposite polarity, the square wave pulses in FIG. 3B can be of the same polarity for both half-cycles of the applied reference waveform. It is a characteristic of the pulse width modulator 16, however, that on positive half-cycles, the square wave pulses will appear on lead 24; whereas on negative half-cycles, they will appear on lead 26.

Let us assume, for example, that during the positive half-cycle the square wave appears on lead 24. This is amplified in pulse amplifiers 28 and 30 and applied via leads 32 and 34 to the output power switch and energy storage circuit 44. In this circuit, hereinafter described in detail, the input waveform is reconstructed as shown in FIG. 3C. This is accomplished by, in effect, integrating the square wave pulses in the waveform of FIG. 3B; and as the pulses become increasingly wider, the amplitude of the output signal increases also. Conversely, as the widths of the square wave pulses in the waveform of FIG. 3B decrease, so does the output waveform of FIG. 3C.

The power output switch and energy storage circuit 44 is shown in detail in FIG. 4 and includes a pair of terminals 58 and 60 to which the positive and negative terminals of a source of direct current potential, not shown, are applied. Square wave pulses of opposite polarity on leads 32 and 34, which occur when the reference waveform is of one polarity, are applied to input terminals 62 and 64; while pulses of opposite polarity on leads 40 and 42, which occur when the reference waveform is of the opposite polarity, are applied to input terminals 66 and 68. A load impedance 70 is connected across the output leads 46 and 48 as shown.

Let us assume that the reference waveform is going through a positive half-cycle. Under these circumstances, pulses corresponding to those shown in FIG. 3B of positive polarity are applied to input terminal 64, while the inverted pulses of negative polarity are applied to input terminal 62. The negative pulses on terminal 62 are applied to the base of a PNP transistor 72, while the positive pulses on terminal 64 are applied to the base of an NPN transistor 74. Under the conditions just described, current will flow from the positive supply terminal 58 through PNP transistor 72 and through an inductance or choke 76 to one side of the load impedance 70. The other side of the load impedance 70 is connected via lead 46, inductor or choke 78 and the NPN transistor 74 to the negative supply terminal 60.

This action will continue as long as the transistors remain on; and when the transistors cut off at the trailing edge of the applied square wave pulse, the energy stored in the inductors 76 and 78 will still cause current to flow between terminals 58 and 60; however in this case the current will flow from terminal 60 through diode 82, inductor 76, load impedance 70, inductor 78 and diode 80 back to the positive supply terminal 58. In this manner, it can be seen that no energy is dissipated across the transistors 72 and 74. Rather, it is stored in inductors 76 and 78 and released after the transistors cut off. Furthermore, the instantaneous amplitude of the signal across the load impedance 70 will be dependent upon the length of time that the transistors 72 and 74 remain on. Consequently, as the width of the square wave pulses in the waveform of FIG. 3B increase in width, so also does the amplitude of the output waveform appearing across load impedance 70; and in this manner the original input waveform is reconstructed.

Similarly, when negative square wave pulses are applied to terminal 66 and positive pulses are applied to terminal 68 during the negative half-cycle of the reference waveform, the negative pulses will turn on PNP transistor 84 and the positive pulses will turn on NPN transistor 86. Current now flows from terminal 58 through transistor 84, inductor 78, load impedance 70, inductor 76 and transistor 86 to terminal 60. When the transistors 84 and 86 cut off, the energy stored in inductors 76 and 78 will still cause current to flow through a circuit from terminal 58 through diode 88, inductor 76, load impedance 70, inductor 78 and diode 90 to terminal 60. Capacitors 93, 95, 97 and 99 act as energy storage devices in the circuit.

During the on-time of transistors 84 and 86, for example, the voltage across inductor 78 is ideally 18 volts for a power supply voltage of 48 volts. Likewise, the voltage across inductor 76 is ideally 18 volts. With 18 volts impressed on a choke of inductance, L, for 12½ microseconds, the current through the choke increases by an amount:

$$V\,dt/L = 225/L \text{ microamps}$$

where:

$L$ = henries.

During the off-time of transistors 84 and 86, the voltage across inductor 78 is ideally −30 volts. Likewise, the voltage across inductor 76 is −30 volts. With −30 volts impressed on a choke of inductance, $L$, for 7 ½ microseconds, the current through the choke decreases by an amount:

$$30 \text{ volts} \times 7\tfrac{1}{2} \times 10^{16}/L \text{ sec.} = 225/L \text{ microamps}$$

The effect of the fluctuating choke current is to charge and discharge the damping capacitors 92, 94, 96 and 98. The nominal value for inductors 78 and 76 is 0.0025 henry each, and the nominal value of the capacitors 92—98 is 0.5 microfarad each. The incremental charge which is alternately added to and subtracted from the capacitors is 0.225 microcoulomb. Consequently, the corresponding peak-to-peak voltage at lead 46 is then:

$$\frac{0.225\times10^{-6} \text{ coulomb}}{1\times10^{-6} \text{ farad}} = 0.225 \text{ volt}$$

However, since the output voltage is taken between leads 46 and 48, and since lead 48 has a corresponding peak-to-peak ripple (180° out of phase with that on lead 46) of 0.225 volt, the total output ripple between leads 46 and 48 is 0.45 volt, peak-to-peak. The corresponding RMS ripple voltage, between leads 46 and 48, is approximately 0.16 volt. This represents a distortion of about 1⅓ percent on a 12-volt direct current output.

With reference now to FIG. 5, one type of pulse width modulator which may be utilized in the present invention is shown. The triangular waveform on lead 20 from waveform generator 18 is applied to input terminal 92 while the triangular waveform on lead 22 from waveform generator 18 is applied to input terminal 94. The reference waveform from summing point 14 is applied to input terminal 96. Finally, a source of driving potential is applied between input terminals 98 and 100.

With the arrangement shown, the triangular waveform on terminal 94, for example, is applied to the base of transistor 102, while the reference signal is applied to the base of transistor 104. The emitters of the transistors 102 and 104 are connected through resistor 106 to the negative terminal 100.

Thus, the transistors are connected together in a common emitter mode and work together as a differential detector, the collectors of the transistors being connected through resistors 108 and 110 to the positive terminal 98.

The collector voltages on transistors 102 and 104 are, in turn, fed into a second-stage differential detector comprising transistors 112 and 114 having their emitters connected to the negative terminal 100 through resistor 116. The collector of transistor 112 is connected directly to the positive terminal 98; while the collector of transistor 114 is connected to the same positive terminal 98 through resistor 116.

With the arrangement shown, an output signal appearing across resistor 116 will be ON whenever the amplitude of the reference waveform on terminal 96 exceeds the triangular waveform on terminal 94. Hence, a series of square wave pulses will be produced as illustrated by the waveform of FIG. 3B, assuming that the input reference is a sinusoidal waveform. Of course, if the input is a direct current voltage, then the pulses in the square wave output will be of constant width, as will the output from the power switch and energy storage circuit 44. The circuitry thus far described operates only when the reference signal is of one polarity. When the reference signal is of the opposite polarity, the signal applied to input terminal 92 comes into play and produces an output square wave across resistor 116', this being produced by a differential detector in which elements corresponding to those in the lower detector are identified by like, primed reference numerals.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In an amplifier, the combination of:

pulse width modulating means having a pair of output terminals and responsive to an input signal and a modulating signal for producing at its respective output terminals two essentially square wave signals in which the widths of the pulses are proportional to the instantaneous amplitude of said input signal, power supply terminals, an electrical load device, a series-connected current path interconnecting said terminals and including a first switch, a first inductor, said load device, a second inductor and a second switch, said switches being connected to the respective power supply terminals and said inductors being intermediate the respective switches and said load device, means connecting said output terminals of the pulse width modulator to said switches such that the respective square wave signals on the modulator output terminals will simultaneously close said switches to cause current to flow through said inductors and said load device, and two diodes each connected between a power supply terminal and the junction of an inductor and the switch to which it is connected for permitting the inductors to discharge stored energy through the load device when said switches are open.

2. The combination of claim 1 wherein said switches comprise a PNP and an NPN transistor and the pulses in the square wave signals are 180° out of phase with respect to each other and are applied to the respective bases of said transistors.

3. The combination of claim 1 including a first capacitor in shunt with one of said switches and the inductor connected thereto, and a second capacitor in shunt with the other of said switches and the inductor connected thereto.

4. The combination of claim 1 wherein the modulating means responsive to said input signal produces said pair of essentially square wave signals in which the widths of the pulses are proportional to the instantaneous amplitude of said input signal only when the input signal is of one polarity, said modulating means having a second pair of output terminals at which a second pair of essentially square wave signals appear in which the widths of the pulses are proportional to the instantaneous amplitude of said input signal when the input signal is of the opposite polarity, said first-mentioned pair of square wave signals being applied to said first and second switches to close the same, a second series-connected current path interconnecting said terminals and including a third switch, said first inductor, said load device, said second inductor, and a fourth switch, said third and fourth switches being connected to the respective power supply terminals and said inductors being intermediate the respective third and fourth switches and said load device, means for connecting said second pair of output terminals to said third and fourth switches to simultaneously close said third and fourth switches to cause current to flow through said inductors and said load device, and a pair of diodes each connected between an input terminal and the junction of one of said third and fourth switches and its associated inductor for permitting the inductors to discharge stored energy through the load device when said second and third switches are open.